(12) United States Patent
White et al.

(10) Patent No.: US 10,843,103 B2
(45) Date of Patent: *Nov. 24, 2020

(54) EXTRACTOR AND RELATED METHODS

(71) Applicant: Bridgestone Corporation, Chuo-ku (JP)

(72) Inventors: Robert W. White, Gilbert, AZ (US); Michael R. Hartzell, Gold Canyon, AZ (US)

(73) Assignee: Bridgestone Corporation, Chuo-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,765

(22) Filed: Apr. 1, 2019

(65) Prior Publication Data
US 2019/0224587 A1    Jul. 25, 2019

Related U.S. Application Data

(63) Continuation of application No. 15/511,981, filed as application No. PCT/US2015/050134 on Sep. 15, 2015, now Pat. No. 10,245,526.
(Continued)

(51) Int. Cl.
*B01D 11/02* (2006.01)
*C08C 2/02* (2006.01)
(Continued)

(52) U.S. Cl.
CPC ........ *B01D 11/023* (2013.01); *B01D 11/0284* (2013.01); *B03B 5/08* (2013.01);
(Continued)

(58) Field of Classification Search
CPC ....... B01D 11/023; B01D 11/00; B01D 11/02; B01D 11/0203; B01D 11/04;
(Continued)

(56) References Cited

U.S. PATENT DOCUMENTS 1,006,311 A * 10/1911 Steffen ................... C13B 10/04
127/6
1,862,945 A * 6/1932 Schlotterhose ......... C11B 1/102
554/175
(Continued)

FOREIGN PATENT DOCUMENTS

EP          0201311 A2    11/1986
EP          0255555 A1    2/1988
(Continued)

OTHER PUBLICATIONS

Extended European Search Report and Search Opinion from EP application No. 15842009.1, dated May 11, 2018.
(Continued)

*Primary Examiner* — Joseph W Drodge
(74) *Attorney, Agent, or Firm* — Meredith E. Hooker; Jenny L. Sheaffer (57) ABSTRACT

An extractor suitable for using a solvent to separate a compound from a solid or semisolid substance containing the compound. The extractor includes a conveying assembly having an inclined conveyor for receiving the substance from a substance inlet and moving the substance through the solvent, an inclined upper surface associated with the first conveyor and an inclined lower surface associated with the first conveyor. The conveyor is configured to move the substance downward through the solvent along the upper surface toward a lower end of the conveyor and upward through the solvent along the lower surface toward an upper end of the conveyor.

20 Claims, 4 Drawing Sheets

Related U.S. Application Data (60) Provisional application No. 62/052,190, filed on Sep. 18, 2014.

(51) Int. Cl.
 *B03B 5/08* (2006.01)
 *C08C 1/04* (2006.01)
 *B01D 11/00* (2006.01)

(52) U.S. Cl.
 CPC .................. *C08C 1/04* (2013.01); *C08C 2/02* (2013.01); *B01D 2011/002* (2013.01)

(58) Field of Classification Search
 CPC .......... B01D 11/0476; B01D 2011/002; B01D 61/145; B01D 61/022; B01D 61/025; B01D 61/142; B01D 61/147; B01D 61/12; B01D 61/027; B01D 2315/16; B01D 2311/263; C08C 1/04; C08C 2/02; B03B 2011/008; B03B 5/00; B03B 5/08; B03B 5/28; B03B 5/36; B03B 5/623; C07K 1/34; B01J 19/002; B01J 19/2475; B01J 19/2465; B01J 8/006; B01J 2219/00245; B01J 2219/00259; B01J 2219/00252; Y02P 20/582; C07D 267/00; C12P 13/02; C07C 67/343
 USPC ......... 209/156, 157, 452, 461–464; 210/511, 210/634; 422/256–259
 See application file for complete search history.

(56) References Cited

U.S. PATENT DOCUMENTS

| | | | |
|---|---|---|---|
| 2,206,595 A | 7/1940 | Bonotto | |
| 2,451,081 A * | 10/1948 | Ford | B01D 11/023 422/268 |
| 2,630,377 A | 3/1953 | Lewis | |
| 2,840,459 A | 6/1958 | Kamofsky | |
| 3,420,708 A | 1/1969 | Schaffer | |
| 3,531,259 A * | 9/1970 | Good | B01D 11/0238 422/268 |
| 3,595,741 A | 7/1971 | Goss | |
| 3,597,163 A | 8/1971 | Van Hengel | |
| 4,213,941 A | 7/1980 | Boomer | |
| 4,435,337 A | 3/1984 | Kay et al. | |
| 4,622,760 A | 11/1986 | Schumacher | |
| 4,751,060 A | 6/1988 | Kratochwill | |
| 4,857,279 A | 8/1989 | Kawamata et al. | |
| 4,956,125 A | 9/1990 | Kawamata et al. | |
| 5,026,549 A | 6/1991 | Coutiere | |
| 5,041,245 A * | 8/1991 | Benado | B01D 11/0226 554/10 |
| 5,321,111 A | 6/1994 | Ji | |
| 5,630,911 A | 5/1997 | Kratochwill | |
| 5,770,082 A | 6/1998 | Anderson | |
| 5,992,050 A | 11/1999 | Kemper et al. | |
| 6,066,350 A | 5/2000 | Purtle et al. | |
| 6,279,250 B1 | 8/2001 | Anderson | |
| 6,361,814 B2 | 3/2002 | Purtle et al. | |
| 6,491,892 B1 | 12/2002 | Bartels et al. | |
| 6,509,051 B1 | 1/2003 | Wills | |
| 6,610,343 B2 | 8/2003 | Purtle et al. | |
| 6,723,454 B2 | 4/2004 | Verhoeven et al. | |
| 6,732,454 B2 | 5/2004 | Anderson et al. | |
| 6,766,595 B2 | 7/2004 | Anderson | |
| 6,996,917 B2 | 2/2006 | Anderson | |
| 7,709,041 B2 | 5/2010 | Purtle et al. | |
| 7,790,036 B2 | 9/2010 | Cornish et al. | |
| 8,157,994 B2 | 4/2012 | Kale et al. | |
| 8,475,660 B2 | 7/2013 | Kale | |
| 8,668,879 B2 | 3/2014 | Kemper et al. | |
| 9,333,441 B2 | 5/2016 | Gu et al. | |
| 10,245,526 B2 * | 4/2019 | White | B01D 11/023 |
| 2002/0062935 A1 | 5/2002 | Speaks et al. | |
| 2004/0137122 A1 | 7/2004 | Purtle et al. | |
| 2011/0162258 A1 | 7/2011 | DeShazo | |
| 2011/0192073 A1 | 8/2011 | Kale | |
| 2011/0192075 A1 | 8/2011 | Kale | |
| 2011/0195085 A1 | 8/2011 | Kale | |
| 2011/0195484 A1 | 8/2011 | Kale | |
| 2011/0195485 A1 | 8/2011 | Kale | |
| 2011/0196131 A1 | 8/2011 | Kale | |
| 2011/0196135 A1 | 8/2011 | Kale | |
| 2011/0253612 A1 | 10/2011 | Kale et al. | |
| 2011/0263883 A1 | 10/2011 | Kale et al. | |
| 2011/0263886 A1 | 10/2011 | Kale | |
| 2012/0021091 A1 | 1/2012 | Kale | |
| 2012/0021118 A1 | 1/2012 | Kale | |
| 2012/0024797 A1 | 2/2012 | Kale | |
| 2012/0028337 A1 | 2/2012 | Kale | |
| 2012/0028339 A1 | 2/2012 | Kale | |
| 2012/0029170 A1 | 2/2012 | Kale | |
| 2012/0029184 A1 | 2/2012 | Kale | |
| 2012/0035348 A1 | 2/2012 | Kale | |
| 2012/0035349 A1 | 2/2012 | Kale | |
| 2012/0045802 A1 | 2/2012 | Kale | |
| 2012/0046454 A1 | 2/2012 | Kale | |
| 2012/0046477 A1 | 2/2012 | Kale | |
| 2012/0053323 A1 | 3/2012 | Kale | |
| 2012/0053324 A1 | 3/2012 | Kale | |
| 2012/0053327 A1 | 3/2012 | Kale | |
| 2012/0053357 A1 | 3/2012 | Kale | |
| 2012/0055079 A1 | 3/2012 | Kale | |
| 2012/0065377 A1 | 3/2012 | Kale | |
| 2012/0065378 A1 | 3/2012 | Kale | |
| 2012/0065418 A1 | 3/2012 | Kale et al. | |
| 2012/0101258 A1 | 4/2012 | Kale | |
| 2012/0108793 A1 | 5/2012 | Kale | |
| 2012/0223013 A1 | 9/2012 | Kale | |
| 2012/0226028 A1 | 9/2012 | Kale | |
| 2012/0228223 A1 | 9/2012 | Kale | |
| 2012/0228224 A1 | 9/2012 | Kale | |
| 2012/0232144 A1 | 9/2012 | Kale | |
| 2012/0232146 A1 | 9/2012 | Kale | |
| 2012/0244585 A1 | 9/2012 | Kale et al. | |
| 2012/0251642 A1 | 10/2012 | Gu et al. | |
| 2012/0255906 A1 | 10/2012 | Kale | |
| 2012/0264194 A1 | 10/2012 | Kale | |
| 2012/0264957 A1 | 10/2012 | Kale | |
| 2012/0264958 A1 | 10/2012 | Kale et al. | |
| 2012/0271038 A1 | 10/2012 | Kale | |
| 2012/0277450 A1 | 11/2012 | Kale | |
| 2012/0282662 A1 | 11/2012 | Kale | |
| 2012/0282679 A1 | 11/2012 | Kale | |
| 2012/0283496 A1 | 11/2012 | Kale | |
| 2013/0022516 A1 | 1/2013 | Kemper et al. | |
| 2013/0041168 A1 | 2/2013 | Kale et al. | |
| 2013/0072661 A1 | 3/2013 | Kale | |
| 2013/0167432 A1 | 7/2013 | Kale | |
| 2013/0197216 A1 | 8/2013 | Cares Pacheco et al. | |
| 2013/0217904 A1 | 8/2013 | Kale | |
| 2014/0001121 A1 | 1/2014 | DeShazo | |
| 2014/0005422 A1 | 1/2014 | Kale | |
| 2016/0376204 A1 * | 12/2016 | Wilke | C10M 175/0025 210/634 |

FOREIGN PATENT DOCUMENTS

| | | | |
|---|---|---|---|
| FR | 945754 A | 5/1949 | |
| GB | 759523 * | 10/1956 | ........... B01D 11/023 |
| GB | 1367508 A | 9/1974 | |
| WO | 2006065236 A1 | 6/2006 | |
| WO | 2006123363 A2 | 11/2006 | |
| WO | 2010114184 A1 | 10/2010 | |
| WO | 2013134429 A1 | 9/2013 | |
| WO | 2013134430 A1 | 9/2013 | |
| WO | 2013173625 A1 | 11/2013 | |
| WO | 2013192182 A1 | 12/2013 | |
| WO | 2013192217 A1 | 12/2013 | |
| WO | 2013192227 A1 | 12/2013 | |
| WO | 2014047176 A1 | 3/2014 | |

(56) References Cited

FOREIGN PATENT DOCUMENTS

OTHER PUBLICATIONS

Crown Specialty Extractors, Nov. 2006.
International Preliminary Report on Patentability and Written Opinion from WO2016-044237A1 (PCT application No. PCT/US2015/050134), 9 pages, dated Mar. 21, 2017.
International Search Report from WO2016-044237A1 (PCT application No. PCT/US2015/050134), 6 pages, dated Dec. 23, 2015.

* cited by examiner

EXTRACTOR AND RELATED METHODS

CROSS-REFERENCE TO RELATED APPLICATIONS

This application is a continuation of U.S. application Ser. No. 15/511,981 filed Mar. 16, 2017, which is a U.S. national stage of International Application No. PCT/US2015/050134, filed Sep. 15, 2015, which claims priority to U.S. Provisional Application Ser. No. 62/052,190, filed Sep. 18, 2014, all of which are hereby incorporated by reference in their entirety.

FIELD OF THE INVENTION

The present application generally relates to extractors and, more particularly, to counter-current solvent extractors.

BACKGROUND OF THE INVENTION

Solvent extraction is a method for separating a compound or substance from one or more other compounds or substances by using one or more solvents. This method is used in industry, and in the laboratory for refining, isolating and purifying a variety of compounds such as oil from seeds. In liquid-liquid extraction, the compound to be extracted is dissolved in a liquid and a liquid solvent is used for the extraction. The process relies on variations in the solubilities of different compounds in different substances. The method may also be applied to solid materials that contain compounds that need to be extracted. Generally, the solvent used dissolves the compound leaving behind the solid material that contained it.

SUMMARY OF THE INVENTION

A first exemplary embodiment is directed to an extractor suitable for using a solvent to separate a compound from a solid or semisolid substance containing the compound. The extractor includes a conveying assembly having an inclined conveyor for receiving the substance from a substance inlet and moving the substance through the solvent, an inclined upper surface associated with the first conveyor and an inclined lower surface associated with the first conveyor. The conveyor is configured to move the substance downward through the solvent along the upper surface toward a lower end of the conveyor and upward through the solvent along the lower surface toward an upper end of the conveyor.

In another exemplary embodiment, the extractor includes a plurality of conveying assemblies arranged in series. Each conveying assembly includes an inclined conveyor for receiving the substance from a substance inlet or a preceding conveying assembly and moving the substance through the solvent, an inclined upper surface associated with the respective conveyor and an inclined lower surface associated with the respective conveyor. Each conveyor is configured to move the substance downward through the solvent along the respective associated upper surface toward a lower end of the conveyor and upward through the solvent along the respective associated lower surface toward an upper end of the conveyor.

In another exemplary embodiment, the extractor includes an inclined screen section forming a portion of an inclined lower surface. The conveyor being configured to move the substance upward across the inclined screen surface to allow solvent to drain from the substance.

BRIEF DESCRIPTION OF THE DRAWINGS

Features and advantages of the present invention will become apparent to those of ordinary skill in the art to which the invention pertains from a reading of the following description together with the accompanying drawings, in which.

DETAILED DESCRIPTION

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements. "Physical communication" as used herein, includes but is not limited to connecting, affixing, joining, attaching, fixing, fastening, placing in contact two or more components, elements, assemblies, portions or parts. Physical communication between two or more components, etc., can be direct or indirect such as through the use of one or more intermediary components and may be intermittent or continuous.

Figure 1:
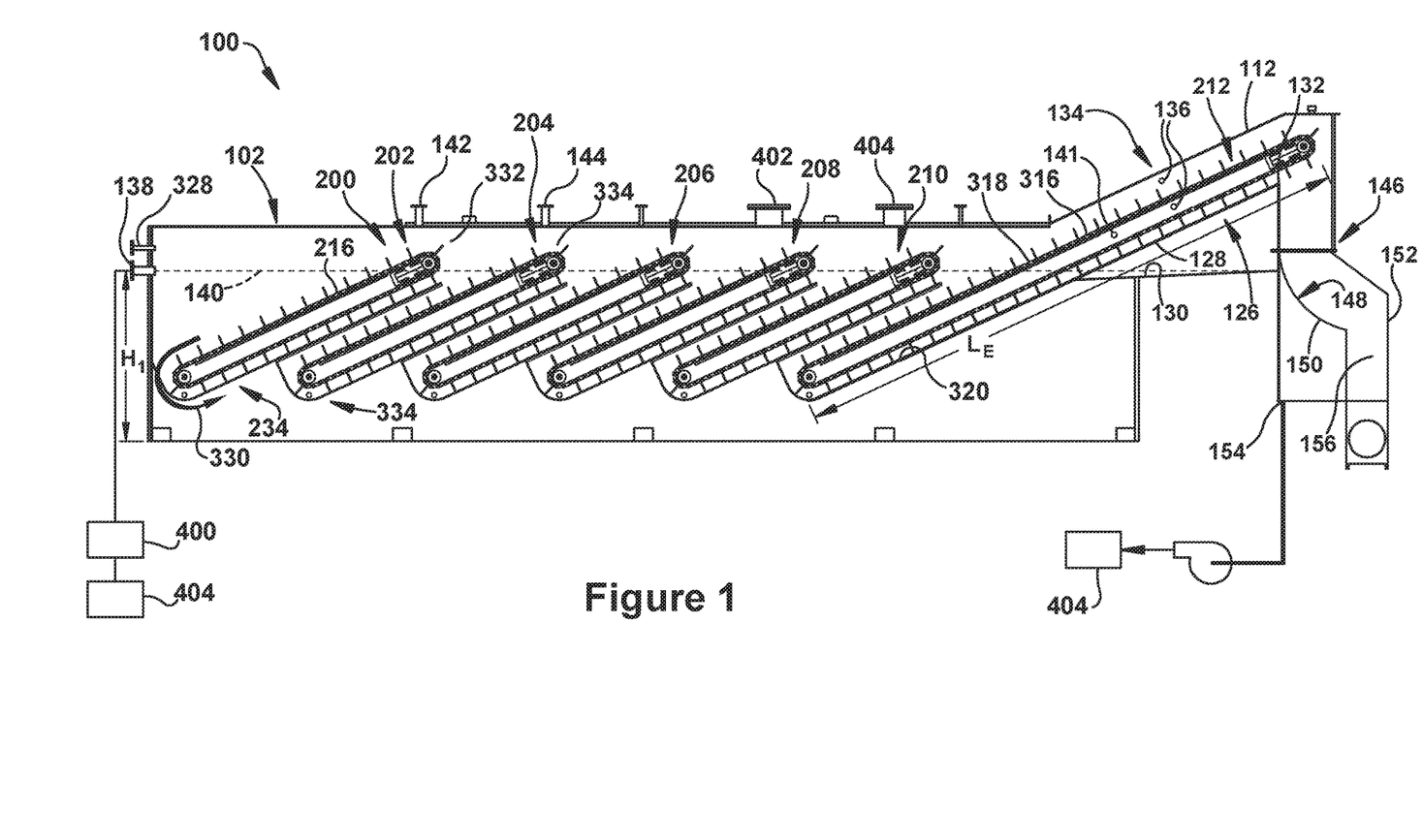
FIG. 1 is a schematic illustration of an exemplary embodiment of an extractor.

FIG. 1 illustrates an exemplary embodiment of an extractor 100 configured to a hold volume of one or more solvents suitable to separate a compound from a solid or semisolid substance containing the compound. While the extractor 100 of FIG. 1 is illustrated as including six conveying assemblies arranged in series, it should be understood that extractors within the scope of the present disclosure may include relatively fewer conveying assemblies or relatively more conveying assemblies, as further described herein. The extractor 100 includes one or more mechanisms configured to move the substance through the solvent. The extractor 100 may be suitable for separating a variety of compounds from a variety of solid or semisolid substances. For example, the substance and compound may be or may include plant matter. The compound may be rubber and the substance may be non-*Hevea* plant matter. The compound may be rubber and resin and the substance may be non-*Hevea* plant matter. As used herein the term "plant matter" means material obtained from a non-*Hevea* plant. Unless otherwise specified, the plant matter may include one or more of roots, stems, bark, woody material, pith, leaves and dirt. In certain embodiments, the extractor 100 is suitable for separating rubber from plant matter, or suitable for separating rubber and resin from non-*Hevea* plant matter. As used herein the term "resin" means the naturally occurring non-rubber chemical entities present in non-*Hevea* plant matter, including but not limited to resins (such as terpenes), fatty acids, proteins, and inorganic materials. As used herein, the term non-*Hevea* plant is intended to encompass plants that contain natural rubber within the individual cells of the plant. In certain embodiments, the non-*Hevea* plant matter is from one or more of the following: *Parthenium argentatum* (Guayule shrub), *Taraxacum Kok-Saghyz* (Russian dandelion), *Euphorbia lathyris* (gopher plant), *Parthenium incanum* (mariola), *Chrysothamnus nauseosus* (rabbitbrush), *Pedilanthus macrocarpus* (candililla), *Asclepias syriaca, speciosa, subulata,* et al (milkweeds), *Solidago altissima, graminifolia rigida,* et al (goldenrods), *Cacalia atripilicifolia* (pale Indian plantain), *Pycnanthemum incanum* (mountain mint), *Teucreum canadense* (American germander) and *Campanula Americana* (tall bellflower). In certain embodiments, the extractor 100 is suitable for use with guayule plant matter. In one exemplary embodiment, the extractor is configured to be suitable for separating natural rubber from guayule biomass. As used herein the term "biomass" is used to refer to the portion of ground or chopped plant matter from a non-*Hevea* plant that is insoluble and, hence, is suspended rather than dissolved by organic solvents. As used herein, biomass should be understood to include a certain amount of dirt and ash, unless otherwise specified.

While the phrases "a compound" or "the compound" are used herein to refer to what is separated from the solid or semisolid substance, it should be understood that the term can be used to refer to one or to more than one compound that is separated. Likewise, while the phrases "a solvent" or "the solvent" are used herein, it should be understood that the phrases encompass not only one solvent but also more than one solvent (e.g., two solvents, three solvents, or more).

Generally, a variety of one or more solvents may be used to separate the compound from the solid or semisolid substance. Depending on the particular application, particular compound sought to be separated, and particular substance from which the separation is made, any suitable solvent may be used with the extractor. Generally, at least one solvent will be used and that solvent will be suitable for solubilizing (and hence extracting) the compound from the solid or semisolid substance. In those embodiments where two compounds are sought to be separated (e.g., rubber and resin), generally two solvents will be utilized, with the first compound being more soluble in one solvent and the second compound being more soluble in the other solvent. In certain embodiments, the solvent comprises water. In certain embodiments, the solvent comprises one or more organic solvents; in certain such embodiments, the solvent comprises at least one polar organic solvent and at least one non-polar organic solvent. A polar organic solvent will preferentially solubilize resin and a non-polar organic solvent will preferentially solubilize rubber. In certain embodiments, the at least one polar organic solvent is selected from alcohols having 1 to 8 carbon atoms (e.g., ethanol, isopropanol, ethanol and the like); ethers and esters having from 2 to 8 carbon atoms; cyclic ethers having from 4 to 8 carbon atoms; and ketones having from 3 to 8 carbon atoms (e.g., acetone, methyl ethyl ketone and the like); and combinations thereof. In certain embodiments, the at least one polar organic solvent comprises or is acetone. In certain embodiments, the at least one non-polar organic solvent is selected from alkanes having from 4 to 9 carbon atoms (e.g., pentane, hexane, heptanes, nonane and the like); cycloalkanes and alkyl cycloalkanes having from 5 to 10 carbon atoms (e.g., cyclohexane, cyclopentane and the like); aromatics and alkyl substituted aromatics having from 6 to 12 carbon atoms (e.g., benzene, toluene, xylene and the like); and combinations thereof. In certain embodiments, the at least one non-polar organic solvent comprises or is: hexane, cyclohexane, or a combination of both.

Figure 2:
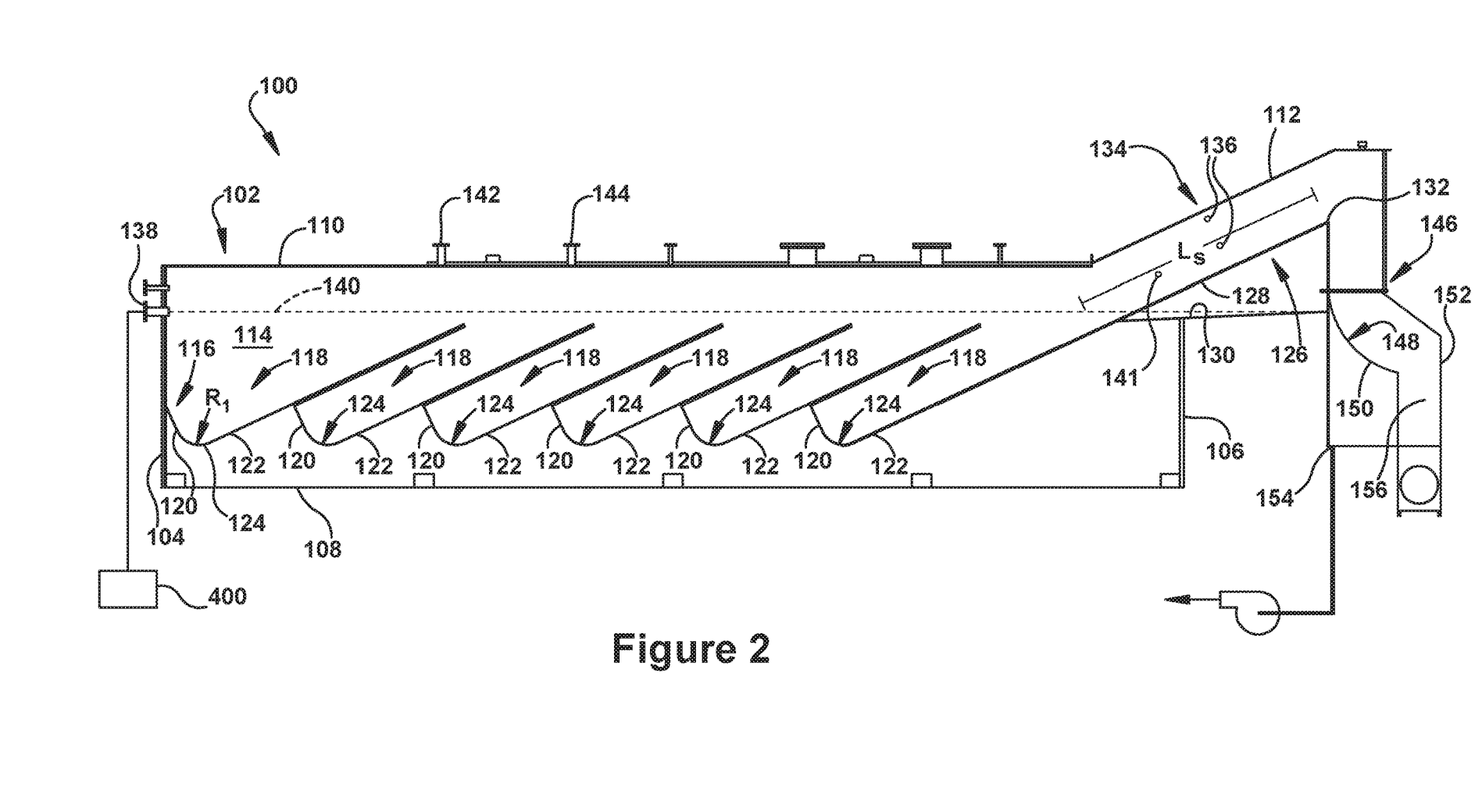
FIG. 2 is a schematic illustration of the extractor of FIG. 1 with the portions of the conveying assemblies removed.

Referring to FIGS. 1 and 2, the extractor 100 includes a housing 102. The housing 102 can be configured in a variety of ways and constructed from a variety of materials. For example, the shape and size of the housing 102 may vary in different embodiments and the housing may be constructed from any materials suitable for the particular application and solvent being used. For example, the housing 102 may be constructed from a metal, such as stainless steel or carbon steel, which is sufficiently resistant to corrosion by a particular solvent. In addition, one or more coatings can be applied to the interior, the exterior, or both, of the housing surfaces to prevent damage caused by the solvent.

In the depicted embodiment, the housing 102 is generally an elongated box-shape having a first end wall 104 and a second end wall 106 that is spaced apart from and generally parallel to the first end wall. A bottom wall 108 extends from the first end wall 104 to the second end wall 106. A top wall or lid 110 is spaced apart from and generally parallel to the bottom wall 108. The top wall 110 extends from the first end wall 104 to an inclined neck section 112 connecting the top wall 110 to the second end wall 106. The housing 102 also includes a first side wall (not shown) and a second side wall (not shown) spaced apart from and generally parallel to the first side wall. The first side wall and the second side wall extend horizontally from the first end wall 104 to the second end wall 106 and extend vertically from the bottom wall 108 to the top wall 110.

The housing 102 forms a tank or internal chamber 114 configured to hold both the solvent and the mechanisms for moving the substance through the solvent. The tank 114 may be configured in a variety of ways, including various shapes and sizes. In the depicted embodiment, the tank 114 includes a floor 116 having one or more recesses 118. It should be understood that the extractor will generally include a number of recesses commensurate with the number of conveying assemblies. Each of the one or more recess 118 has a first floor portion 120 and a second floor portion 122 extending traverse to the first floor portion. In the depicted embodiment, the second floor portion 122 extends at approximately a 90 degree angle to the first floor portion 120. In other embodiments, however, the second floor portion 122 may extend at an angle greater than or less than approximately 90 degrees to the first floor portion 120. The first floor portion 120 and the second floor portion 122 are connected by curved corner 124 having a radius $R_1$. The first floor portion 120 inclines upward from the corner 124 generally toward the first side wall 106 and the second floor portion 122 inclines upward from the corner 124 generally toward the second side wall 106.

The inclined neck section 112 includes an inclined screen section 126 forming a least a portion of the floor of the inclined neck section 112. The inclined screen section 126 may be formed in a variety of ways. Any porous structure capable of allowing solvent to drain from the substance may be used. In the exemplary embodiment, the inclined screen section 126 includes a metal wedge wire screen 128 and has a length $L_s$. Below the inclined screen section 126 is an inclined catch surface 130 configured to divert solvent back to a tank or internal chamber 114. The inclined screen section 126 includes an upper terminal end 132.

The extractor 100 may include one or more inlets and one or more outlets for the solvent and for the solid or semi-solid substance to enter and exit the extractor. The number, configuration, and location of the one or more inlets and outlets for the solvent and the substance can vary in different embodiments of the extractor. While an inlet or an outlet may be described as a solvent inlet, a solvent outlet, a substance inlet or a substance outlet, that description is not meant to be limiting. For example, during operation of the extractor, the substance and the solvent necessarily mix and the substance exiting the extractor 100 may be laden with solvent while the solvent exiting the extractor 100 may have particles of the substance suspended in the solvent. Likewise, the exiting solvent and substance may be recycled and reintroduced into the extractor for further processing.

In the depicted embodiment, the extractor 100 includes a first solvent inlet 134 located in the neck section 112 of the extractor 100. The first solvent inlet 134 includes one or more nozzles 136 directed to spray solvent in a generally downward direction over the inclined screen section 126 where the inclined catch surface 130 diverts that solvent into the tank 114. The extractor 100 includes a first solvent outlet 138 located in the first side wall 104 at a height $H_1$ above the bottom wall 102. The height $H_1$ of the first solvent outlet 138 can be used to set the level of solvent in the tank 114 as depicted by the dashed line 140 in FIG. 1. Optionally, the extractor 100 may include additional solvents inlets and outlets. For example, in one exemplary embodiment, the extractor 100 includes a second solvent inlet 141 located in the neck section 112. The second solvent inlet 141 may be configured in a similar manner to the first solvent inlet 134 to spray solvent in a generally downward direction over the inclined screen section 126, though other configurations are possible. In one exemplary embodiment, the first solvent inlet 134 is configured to spray new solvent into the extractor 100 and the second solvent inlet 141 is configured to spray recycled or recovered solvent into the extractor.

The extractor 100 includes a first substance inlet 142 for introducing, into the extractor, the solid or semi-solid substance containing the compound to be separated by the solvent. The first substance inlet 142 is located in the top wall 110 and configured such that substance entering the substance inlet will drop vertically downward into the tank 114. Optionally, the first substance inlet 142 may be located at a different location or additional substance inlets may be provided. In the depicted embodiment, a second substance inlet 144 is located in the top wall 110 and configured similar to the first substance inlet 142 such that substance entering the second substance inlet 144 will drop vertically downward. The second substance inlet 144 is positioned closer to the second end wall 106 than the first substance inlet 142. In certain embodiments, the substance that drops vertically downward from a substance inlet drops onto a conveying assembly, such as onto the chain of a conveying assembly.

As discussed above, in certain embodiments, the substance comprises non-*Hevea* plant matter, including in certain such embodiments guayule plant matter. Generally, any non-*Hevea* plant matter (e.g., guayule plant matter) entering the extractor will have been chopped or otherwise reduced in size from its natural state. In certain embodiments, the guayule plant matter entering the extractor has an average size of 2 inches or less, 1.5 inches or less, or 1 inch or less. The size reduction of the non-*Hevea* plant matter may be achieved using various physical means, some of which may assist in removing relatively more rubber from the cells of the plant matter. Exemplary apparatus for size reduction include: a shredder, a granulator, a hammer mill, a roller mill, and combinations thereof.

The extractor 100 includes a first substance outlet 146 located in the neck section 112 adjacent the upper terminal end 132 of the inclined screen section 126 and configured to allow the substance to exit the extractor 100. The first substance outlet 146 optionally includes run-down screen 148. The run-down screen 148 is configured to receive the substance that has passed through the solvent in the extractor 100 and allow the solvent to drain from the substance while the substance resides on the run-down screen 148. It should be understood that generally only a portion of the solvent associated with the substance will drain while the substance resides on the run-down screen; in other words, when the substance falls off of the run-down screen into the discharge chute 156, it will not be dry, but will still contain solvent. The run-down screen 148 can be configured in a variety of ways. Any porous structure configured to allow solvent to drain from the substance may be used. In the exemplary embodiment, the run-down screen 148 is a curved, static screening component having one or more wedge wire screen panels 150 with slots (not shown) for slowing drainage of the solvent. The wedge wire panels 150 are fitted within a housing 152 that includes a second solvent outlet 154 under the run-down screen 148 and a substance discharge chute 156. The housing 152 may be configured in a variety of ways and constructed of a variety of materials. In the exemplary embodiment, the housing 152 is made from stainless steel sheets. The run-down screen 148 has no moving parts and removal of the substance from the run-down screen 148 is gravity fed, so the screen is essentially maintenance free.

Referring to FIG. 1, the extractor 100 includes one or more mechanisms for conveying the substance through the solvent the extractor. The one or more mechanisms may be configured in a variety of ways. Any mechanism(s) capable of receiving the substance introduced into the extractor 100 and moving the substance through the solvent may be used. In the illustrated exemplary embodiment, the one or more mechanisms are configured as a six conveying assemblies 200, though in other embodiments, more or less than six conveying assemblies may be used. As shown in FIG. 1, the extractor 100 includes a first conveying assembly 202, a second conveying assembly 204, a third conveying assembly 206, a fourth conveying assembly 208, a fifth conveying assembly 210, and a sixth conveying assembly 212. In certain embodiments, the last conveying assembly (i.e., the conveying assembly closest the substance outlet) is referred to as an exit conveying assembly.

Figure 3:
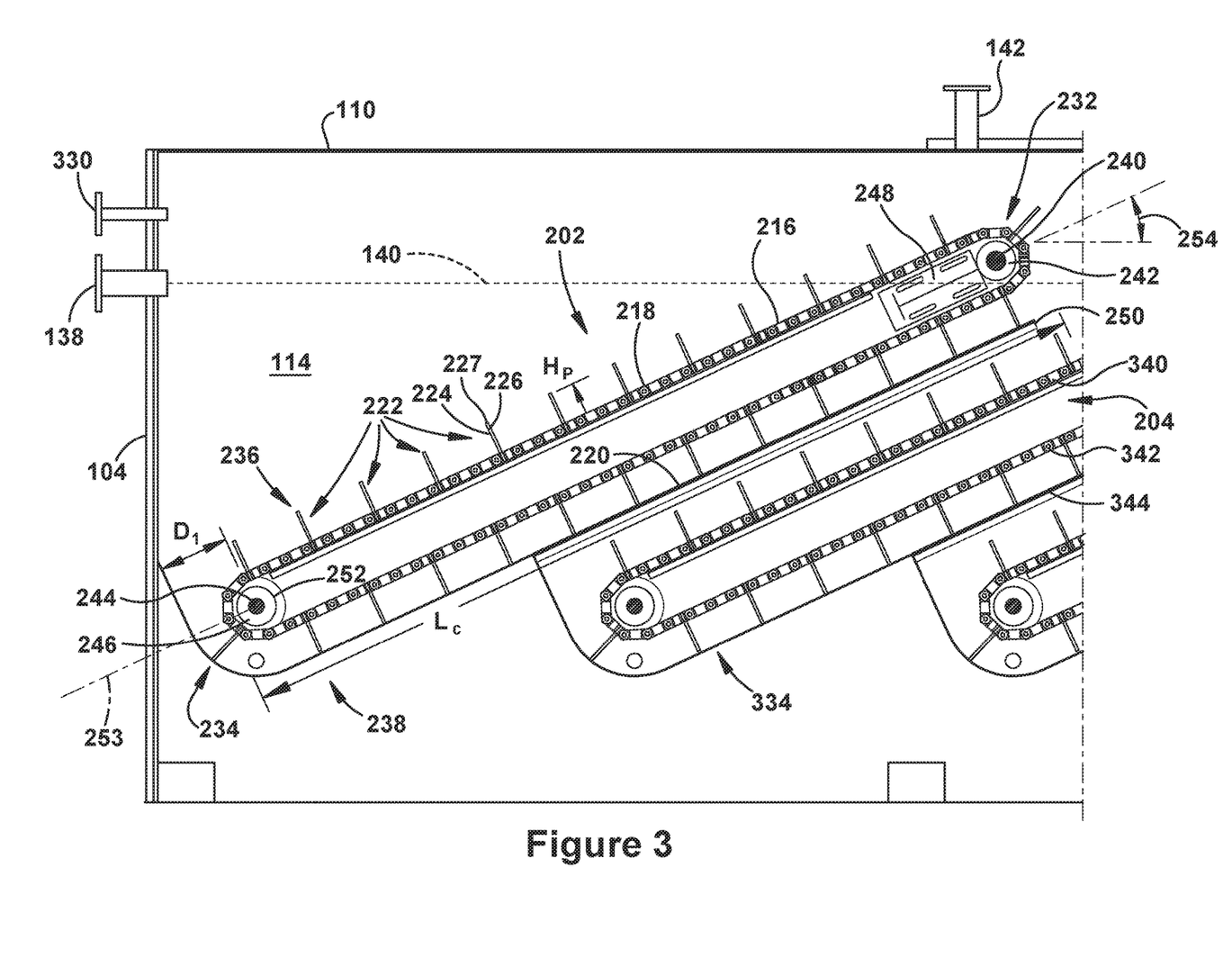
FIG. 3 is an enlarged view of a conveying assembly of the extractor of FIG. 1.
Figure 4:
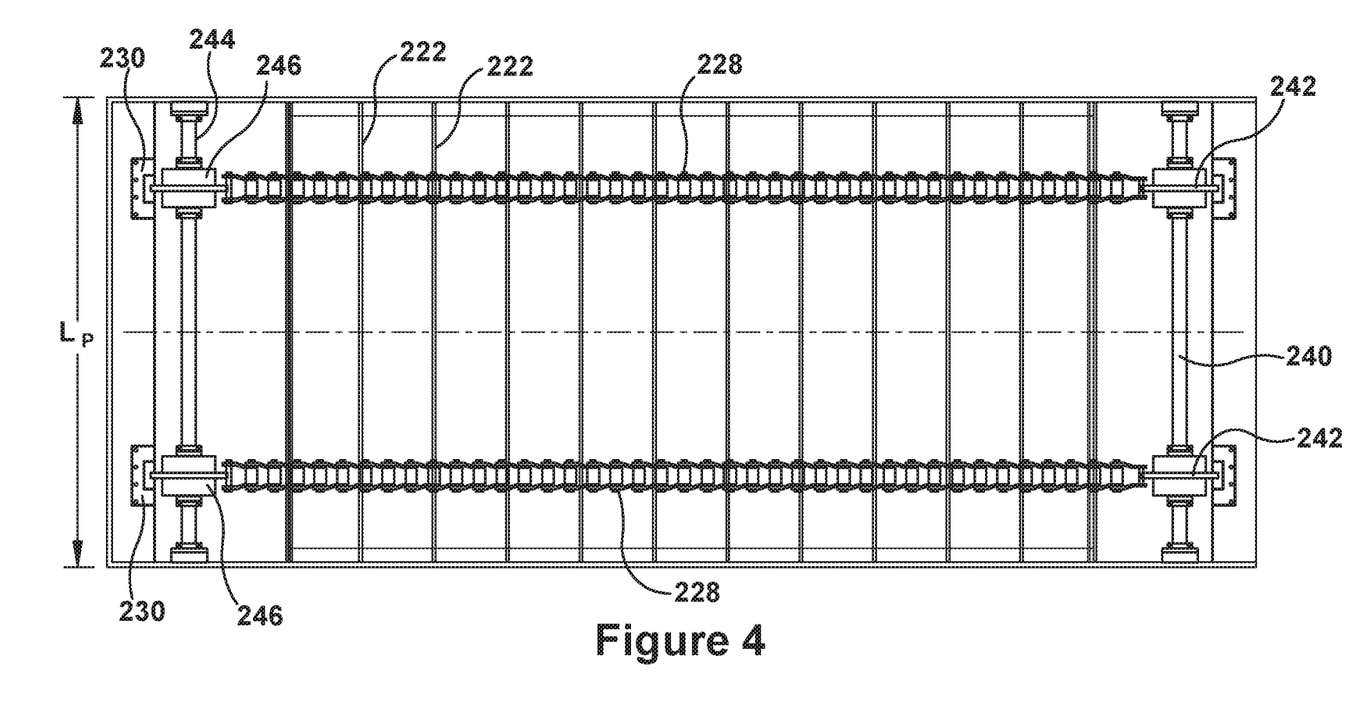
FIG. 4 is a top view of a conveyor of the extractor of FIG. 1.

Referring to FIGS. 3 and 4, the first conveying assembly 202 includes a conveyor 216, an upper inclined surface 218 associated with the conveyor, and a lower inclined surface 220 associated with the conveyor. The conveyor 216, the upper inclined surface 218, and the lower inclined surface 220 may be configured in a variety of ways. In the depicted embodiment, the conveyor 216 is a continuous conveyor having a plurality of spaced apart paddles 222. The paddles 222 are generally elongated and rectangular having front face 224, a back face 226 generally parallel to and facing in the opposite direction of the front face 224, and an outer edge 227 connecting the front face 224 to the back face 226. Each paddle 222 has a height $H_p$ and a length $L_p$. The shape, height, length, spacing and number of paddles may vary in different exemplary embodiments of the conveyor 216. The paddles are generally configured to assist in moving the substance along through the extractor, particularly around the curved corners (e.g., 234) of the first floor portion and upward along the second floor portion of the recess in which the conveyor is positioned. In preferred embodiments the paddles are flexible or at least comprise a flexible tip portion; flexibility of the paddles aids in operation of the conveyor, eliminating or at least minimizing operating difficulties whereby one or more paddles becomes hung-up or stuck with packed solid or semi-solid substance. The paddles may be constructed of various materials which are preferably non-reactive with the substance and the solvent. In certain embodiments, the paddles are plastic, non-limiting examples of which include polyurethane and polyvinyl chloride.

The paddles 222 are connected to a pair of continuous chains 228, though in other embodiments, more or less than a pair of chains may be used. The paddles 222 are attached to the chains 228 by any suitable means. In the illustrated embodiment, each paddle 222 is connected to each chain 228 by a bracket 230 such that each paddle 222 extends generally perpendicular from the chains 228. In other embodiments, however, the paddles 222 may extend from the chains at an angle greater than or less than about 90 degrees.

The conveyor 216 includes an upper end 232, a lower end 234 opposite the upper end, an upper side 236 between the upper end 232 and the lower end 234, and a lower side 238 beneath the upper side and between the upper end 232 and the lower end 234. The upper end 232 includes a rotatable upper axle 240 onto which a pair of sprockets 242 are fixably mounted. The lower end 234 includes a rotatable lower axle 244 onto which a pair of sprockets 246 are fixably mounted. The chains 228 are configured to mount onto both the sprockets 244 on the upper axle 240 and the sprockets 246 on the lower axle 244 such that rotation of the upper axle and the lower axle will move the paddles 222 along the upper side 236 and the lower side 238, and around the upper end 232 and the lower end 234.

The conveyor 216 is powered by at least one power source 248. The at least one power source 248 can be any suitable power source capable of causing rotation of the conveyor. In the exemplary embodiment, the at least one power source 248 includes an electric motor mounted adjacent the upper axle 240 of each conveyor 216 and configured to rotate the upper axle. Thus, each of the conveyor assemblies 200 includes a separate power source 248 for powering the conveyor of that assembly. In other embodiments, however, the power source 248 may power more than one conveyor assembly.

The upper inclined surface 218 is positioned below the paddles 222 on the upper side 236 of the conveyor. The upper inclined surface 218 extends from the upper end 232 to the lower end 234 of the conveyor 216 and has a width (not shown) generally equal to the length $L_p$ of the paddles 222. The upper inclined surface 218 is positioned below the paddles 222 such that the paddles move adjacent to or engage the upper inclined surface when the conveyor 216 is operating. The upper inclined surface 218 can be integral to the conveyor 216 or can be a separate surface. For example, the upper inclined surface 218 may be a surface attached to the housing 102 or may be attached to a portion of the conveyor 216.

The lower inclined surface 220 is positioned below the paddles 222 on the lower side 238 of the conveyor. The lower inclined surface 220 extends from the upper end 232 to the lower end 234 of the conveyor 216 and has a width (not shown) generally equal to the length $L_p$ of the paddles 222. The lower inclined surface 220 includes an upper terminal end 250 positioned adjacent the upper end 232 of the conveyor 216. The lower inclined surface 220 is positioned below the paddles 222 such that the paddles move adjacent to or engage the lower inclined surface when the conveyor 216 is operating. The lower inclined surface 220 can be integral to the conveyor 216 or can be a separate surface. For example, the lower inclined surface 220 may be a surface fixably attached to the housing 102 or may be a surface attached to a portion of the conveyor 216. The lower inclined surface 220 can include a portion of the floor 116, such as for example, the second floor portion 122.

The conveyor 216 is received within one of the one or more the recesses 118 such that the lower end 234 is adjacent the corner 124. When the paddles 222 rotate around the lower end 234 of the conveyor 216, the outer edge 227 of the paddles 222 is a distance $D_1$ from a centerline 252 of the lower axle 244. The distance $D_1$ is generally equal to the radius $R_1$ of the corner 124 such that the outer edge 227 of the paddles 222 generally contact the corner 124 of the floor 116 as the paddles 222 move around the lower end 234 of the conveyor 216.

The upper inclined surface 218 is generally parallel to the lower inclined surface 220. The lower inclined surface 220 may include the second floor portion 122 or may be a separate surface. For example, the lower inclined surface 220 may be a separate surface positioned adjacent to and parallel with the second floor portion 122 to form a continuous inclined surface for the paddles 222 to move along. Thus, the paddles 222 transition from moving along the second floor portion 122 to moving along the separate surface. In another exemplary embodiment, the lower inclined surface 220 may be positioned on top of the second floor portion 122 such that the paddles 222 transition from moving around the corner 124 to moving along the lower inclined surface 220 with contacting or minimally contacting the second floor portion 122.

The conveyor 216 has a length $L_c$ and a longitudinal axis 253 that is generally parallel with the upper inclined surface 218 and the lower inclined surface 220, thus the conveyor is inclined. In an exemplary embodiment, the incline angle 254 of the first conveyor assembly 202 is in the range of about 15 degrees to about 35 degrees. In another exemplary embodiment, the incline angle 254 is in the range of about 22 degrees to about 28 degrees.

The second conveying assembly 204, the third conveying assembly 206, the fourth conveying assembly 208, and the fifth conveying assembly 210 are substantially similar to the first conveyor assembly 202 in that they include a conveyor, an associated upper inclined surface, and an associated lower inclined surface that are arranged and operate in the same manner as the conveyor 216, the upper inclined surface 218, and a lower inclined surface 220 of the first conveying assembly 202. In addition, the second conveying assembly 204, the third conveying assembly 206, the fourth conveying assembly 208, and the fifth conveying assembly 210 are received in a recess 118 in the floor 116 similar to the first conveying assembly 204. Therefore, the above description regarding the first conveying assembly 204 applies equally to the second conveying assembly 204, the third conveying assembly 206, the fourth conveying assembly 208, and the fifth conveying assembly 210.

In the exemplary embodiment of FIG. 2, the second conveying assembly 204, the third conveying assembly 206, the fourth conveying assembly 208, and the fifth conveying assembly 210 are substantially parallel to the first conveying assembly 202. Similarly, when the number of conveying assemblies differs from the number shown in the exemplary embodiment of FIG. 2, each of those conveying assemblies are substantially parallel to each other in certain embodiments. In other embodiments, however, the conveying assemblies 200 may differ in incline angle (i.e., be positioned within the extractor at relatively different incline angles). Likewise, in other embodiments, when the number of conveying assemblies differs from the number shown in the exemplary embodiment of FIG. 2, each of those conveying assemblies may differ in incline angle.

The sixth conveying assembly 212 is configured to operate as an exit conveying assembly (i.e. the last conveying assembly 212 prior to the first substance outlet 142). The sixth conveying assembly 212 is similar to the first conveyor assembly 202 in that it includes a conveyor 316, an upper inclined surface 318, and a lower inclined surface 320 that are arranged and operate in the same manner as the conveyor 216, the upper inclined surface 218, and a lower inclined surface 220 of the first conveying assembly 202. In addition, the sixth conveying assembly 212 is received in a recess 118 in the floor 116 similar to the first conveying assembly 204. Therefore, the above description regarding the first conveying assembly 204 generally applies to the sixth conveying assembly 212.

The conveyor 316 of the sixth conveying assembly 212, however, has a length $L_E$ that is greater than the length $L_c$ of the conveyors of the first through the fifth conveying assemblies 202, 204, 206, 208, 210. The additional length of the sixth conveyor 316 allows the sixth conveying assembly 212 to extend upward through the neck section 112 of the housing, over the inclined screen section 126, to the first substance outlet 146. In one exemplary embodiment, the conveyor 316 has a length that is approximately 175% to approximately 200% the length of the first conveyor. In certain embodiments, the length $L_s$ of the inclined screen section 126 is approximately 40% to approximately 55% the length $L_E$ of the sixth conveyor 316.

Referring to FIG. 1, in operation, the first, second, third, fourth, fifth, and sixth conveyor assemblies 202, 204, 206, 208, 210, 212 form a multi-stage solvent extracting process, with each conveying assembly forming an individual stage. The tank 114 of the extractor 100 is filled with solvent up to the solvent level 140. Solvent in the extractor flows generally from right to left as illustrated in FIG. 1. In particular, solvent is introduced into the extractor 100 by the first solvent inlet 134, and optional additional solvent inlets, such as for example, the second solvent inlet 141. The first solvent inlet 134, and optionally the second solvent inlet 141, spray solvent onto the inclined screen section 126 in the neck section 112. The solvent flows through the inclined screen section 126 and onto the inclined catch surface 130. The solvent then flows downward along the inline catch surface 130 and into the tank 114.

The first solvent outlet 138 functions as an overflow. When the solvent level 140 rises up to the height $H_1$ of the first solvent outlet 138, the solvent flows out of the first solvent outlet to maintain the solvent level in the tank 114. As shown in FIGS. 1 and 3, the solvent level 140 is above the upper terminal end 250 of the lower inclined surface 220 of the first conveyor assembly 202 and likewise for the other conveying assemblies 204, 206, 208, 210, 212. Therefore, the solvent introduced into the extractor 100 at the first solvent inlet 134 has a flow path over the upper terminal ends of the lower inclined surfaces of the conveying assemblies 200 to the first solvent outlet 138.

It should be understood that the relative level of the terminal ends of the lower inclined surfaces as compared to the solvent level, can be adjusted by modifying the solvent level 140 to be higher or lower. This can be accomplished, for example, by blocking solvent flow from the first solvent outlet 138 and providing a second solvent outlet 328 (see FIG. 3) at a height greater than the height $H_1$ of the first solvent outlet 138.

In the exemplary embodiment, solid or semi-solid substance containing the compound to be separated is introduced into the extractor 100 above the first conveying assembly 202 through the first substance inlet 142. This first substance inlet 142 is positioned above the first conveying assembly 202 such that the substance introduced into the extractor 100 falls downward into the solvent at a position closer to the upper end 232 of the conveyor 216 than the lower end 234 of the conveyor.

The substance then settles through the solvent onto the upper inclined surface 218 where the substance is engaged by the conveyor 216. The first conveyor 216 is configured to rotate in a counterclockwise manner as illustrated by arrow 330 in FIG. 1. While the primary operation of the first conveyor 216 is intended to be counterclockwise, in certain embodiments, the conveyor is reversible so that it may be operated in a clockwise direction; such reverse operation may be useful for limited periods of time such as to increase the contact time between the at least one solvent and the solid or semi-solid substance. The paddles 222 of the first conveyor 216 engage the substance and assist in moving the substance downward through the solvent along the first upper surface 216 toward the lower end 234 of the first conveyor. At the lower end 234, the paddles 222 assist in moving the substance around the corner 124. Since the outer edge 227 of the paddles 222 is at a distance $D_1$ from the lower axle center line 252 that is generally equal to the radius $R_1$ of the corner 124, the paddles can generally engage the entire surface of the corner preventing substance from accumulating in the corner. Once the first conveyor 216 moves the substance around the corner 124, the paddles 222 assist in moving the substance upward through the solvent along the first lower surface 220 toward the upper end 232.

The upper end 232 of the first conveying assembly 202 is positioned above the second conveying assembly 204. When the substance reaches the upper terminal end 250 of the inclined first lower surface 220, it is moved beyond the upper terminal end 250 such that substance falls from the first lower surface 220 of the first conveying assembly 202 toward the second conveying assembly 204. The upper terminal end 250 of first lower surface 220 may be positioned such that the substance falls toward the second conveying assembly 204 at a position closer to an upper end 333 of the third conveying assembly 204 than to a lower end 334, though that is not required.

In the exemplary embodiment of FIGS. 1-4, the upper terminal end 250 of the first lower surface 220 is below the solvent level 140. Therefore, when the substance is moved over the upper terminal end 250 and falls toward the second conveying assembly 204, the substance remains at least substantially constantly immersed in the solvent.

The substance that falls from the first lower surface 220 of the first conveying assembly toward the second conveying assembly 204 will settle through the solvent such that the substance can be engaged by the second conveyor 342. The second conveyor 342 will then complete similar actions to the first conveying assembly 202 by moving the substance downward through the solvent along the inclined upper surface 340 of the second conveying assembly 204, around the corner 124, and upward through the solvent along the inclined lower surface 344 of the second conveying assembly 204 before depositing into the solvent above the third conveying assembly 206. This process repeats itself until the substance reaches the last (e.g., sixth) or exit conveying assembly 212. While the primary operation of the conveyor associated with the second conveying assembly 204, and the conveyors associated with subsequent conveying assemblies (206, 208, 210 and 212) is intended to be counterclockwise, in certain embodiments, one or more of the conveyors is reversible so that it may be operated in a clockwise direction; such reverse operation may be useful for limited periods of time such as to increase the contact time between the at least one solvent and the solid or semi-solid substance.

As with the previous conveying assemblies 200, the conveyor 316 of the sixth conveying assembly 212 moves the substance downward through the solvent along the inclined upper surface 318, around the corner 124, and upward through the solvent along the inclined lower surface 320 of the sixth conveying assembly. While the primary operation of the conveyor 316 of the sixth conveying assembly 212, is intended to be counterclockwise, in certain embodiments, the conveyor 316 is reversible so that it may be operated in a clockwise direction; such reverse operation may be useful for limited periods of time such as to increase the contact time between the at least one solvent and the solid or semi-solid substance. The inclined lower surface 320 associated with the sixth conveying assembly 212, however, at least partially includes the inclined screen section 126. Once the sixth conveyor 316 moves the substance above the solvent level 140 and over the inclined screen section 126, at least a portion of the solvent may drain from the solvent-laden substance through the screen section and onto the inclined catch surface 130 to be reintroduced to the tank 114. At the same time, the first solvent inlet 134, and optionally the second solvent inlet 141, spray solvent over the substance and the inclined screen section 126 as the sixth conveyor 316 moves the substance upward along the inclined screen section.

At the terminal upper end 132 of the inclined screen section 126, the paddles 222 assist in moving the substance beyond the terminal upper end such that the substance falls from the lower inclined surface 320 onto the run-down screen 148. As the substance collects on the run-down screen 148, at least a portion of the solvent drains from the substance through the screen to the second solvent outlet 154 where it can be removed from the extractor 100. Over time, the substance passes down the screen 148 and builds up before eventually falling off the screen under the force of gravity and into the substance discharge chute 156.

In some exemplary embodiments, the substance is introduced into the extractor 100 above the second conveying assembly 204 instead of the first conveying assembly 202. For example, the substance can be introduced into the extractor 100 through the second substance inlet 144 instead of the first substance inlet 142, or alternatively, the first substance inlet 142 may be positioned above the second conveying assembly 204 instead of the first conveying assembly 202. Alternatively, the first substance inlet is positioned above the second conveying assembly. Thus, the first conveying assembly 202 is configured to not receive newly introduced substance. Instead, the first conveying assembly 202 acts as a clarification assembly positioned between the inlet used for introducing substance to the extractor 100 and the first solvent outlet 138. By intentionally not depositing new substance into the solvent in the area around the first conveying assembly 202, larger particles of substance suspended in the solvent may settle onto the first conveying assembly 202 and be moved through the solvent to the second conveying assembly 204 in a similar manner in which the other conveying assemblies 200 operate.

Solvent that exits the first solvent outlet 138 includes the compound that has been extracted from the substance and may also include small (fine) particles of substance. When the solvent that exits the extractor includes solubilized rubber, it may be referred to as miscella; in certain embodiments, the solvent (or miscella) that exits the extractor contains solubilized rubber and solubilized resin. Optionally, one or more separators 400 may be in fluid communication with the first solvent outlet 138 and configured to separate the small particles of substance from the exiting solvent. The one or more separators 400 may be configured in a variety of ways. Any separator 400 suitable for separating small particles of the substance from the solvent may be used. For example, the separator 400 may be a centrifuge, a filter, or other suitable separating mechanism. In the exemplary embodiment, the one or more separators 400 include at least one centrifuge. The separated substance particles can be reintroduced back into the extractor 100 at the first substance inlet 142, the second substance inlet 144, or at an additional substance inlet. For example, referring to FIG. 1, an optional third substance inlet 402 is positioned above the fourth conveying assembly 208 and optional fourth substance inlet is positioned above fifth conveying assembly 210. The separated substance particles could be moved from the separator 400 to any suitable substance inlet on the extractor 100. It should be understood that the use of any separator (such as 400) to separate small particles of substance from the solubilized compound in the solvent(s), after the solvent exits the extractor (such as through first solvent outlet 138) is not in any way essential to the design or operation of the extractor described herein.

The substance that exits the extractor 100, such as for example, from the first discharge chute 156 of the first substance outlet 146 or an additional substance outlet, can in certain embodiments be directed to one or more desolventizers 404. The one or more desolventizers 404 are generally configured to separate any remaining solvent from the exiting substance. The one or more desolventizers 404 may be configured in a variety of ways. For example conventional desolventizing processes, applying principles of steam or heat-stripping or vacuum evaporation may be used. Non-limiting examples of desolventizing apparatus include, but are not limited to solvent extraction towers, desolventizing screw apparatus. It should be understood that any desolventization of the substance that takes place after it exits the extractor is not in any way essential to the design or operation of the extractor described herein. However, in practice, disposal of or further use of the substance that exits the extractor may practically require removal of all or substantially all of the solvent contained therein.

In certain embodiments, the solvent separated from the substance by the one or more desolventizers 400 can be recycled and reintroduced into the extractor 100 at the first solvent inlet 134, the second solvent inlet 141, or an additional solvent inlet of the extractor 100.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative compositions and processes, and illustrative examples shown and described. Accordingly, departures may be made from such details without departing from the spirit or scope of the general inventive concept.

What is claimed is:

1. An extractor suitable for using a solvent to separate a compound from a solid or semi-solid substance containing the compound, comprising:
   a tank configured to contain solvent at a predetermined level within;
   a substance inlet for introducing the solid or semi-solid substance into the extractor;
   a substance outlet for removing the solid or semi-solid substance from the extractor;

a solvent inlet for introducing the solvent into the extractor;
a solvent outlet for removing the solvent from the extractor; and
a first conveying assembly including:
   an inclined first conveyor for receiving the solid or semi-solid substance from the substance inlet and moving the solid or semi-solid substance through the solvent within the tank, the inclined first conveyor including an upper end and a lower end opposite its upper end;
   wherein the inclined first conveyor includes an inclined first upper surface and an inclined first lower surface having an upper terminal end;
   wherein the inclined first conveyor is configured to move the solid or semi-solid substance downward through the solvent within the tank and along the inclined first upper surface toward the lower end and upward through the solvent within the tank and along the inclined first lower surface toward the upper end, and
   wherein the upper terminal end of the inclined first lower surface is positioned at or below the predetermined level for solvent within the tank;
the extractor characterized in that it includes
an inclined neck section; and
an exit conveyor positioned between the inclined first conveyor and the substance outlet and substantially parallel to the inclined first conveyor, the exit conveyor including an upper end and a lower end opposite its upper end;
an inclined exit upper surface associated with the exit conveyor;
an inclined exit lower surface associated with the exit conveyor and at least partially comprising an inclined screen section configured to allow solvent to drain from the solid or semi-solid substance;
wherein the exit conveyor is configured to move the solid or semi-solid substance downward through the solvent within the tank and along the inclined exit upper surface of the exit conveyor toward the exit conveyor lower end and upward through the solvent along the inclined exit lower surface toward the exit conveyor upper end and then along the inclined screen section of the exit conveyor toward the upper end of the exit conveyor,
wherein the exit conveyor has a length that is greater than the length of the inclined first conveyor of the first conveying assembly, the greater length allowing the exit conveyor to extend upward through the inclined neck section, and
wherein the compound comprises rubber and the solid or semi-solid substance comprises plant matter.

2. The extractor of claim 1, further comprising:
a second conveying assembly positioned between the first conveying assembly and the exit conveyor, the second conveying assembly including:
   a second inclined conveyor positioned between the inclined first conveyor and the substance outlet and substantially parallel to the inclined first conveyor, the second inclined conveyor including an upper end and a lower end opposite its upper end;
   wherein the second inclined conveyor includes an inclined second upper surface and an inclined second lower surface;
   wherein the second conveyor is configured to move the solid or semi-solid substance downward through the solvent within the tank and along the inclined second upper surface toward the second conveyor lower end and upward through the solvent within the tank and along the inclined second lower surface toward the second conveyor upper end.

3. The extractor of claim 2, wherein the upper terminal end of the inclined first lower surface is positioned above the second inclined conveyor such that the solid or semi-solid substance falls from the inclined first lower surface toward the inclined second upper surface when moved beyond the upper terminal end by the inclined first conveyor.

4. The extractor of claim 2, wherein the exit conveyor has a length that is approximately 175% to approximately 200% the length of the second inclined conveyor.

5. The extractor of claim 2, further comprising a separator in fluid communication with the solvent outlet, the separator configured to separate small particles of substance from solvent as it exits the solvent outlet.

6. The extractor of claim 2, wherein the substance outlet includes a run-down screen configured to receive solvent and solid or semi-solid substance from the exit conveyor and allow at least a portion of the solvent to drain from the solid or semi-solid substance while on the screen; wherein the run-down screen has no moving parts and allows for removal of the solid or semi-solid substance from the run-down screen by gravity.

7. A method of separating a compound from a solid or semi-solid substance using at least one solvent in the tank of the extractor of claim 2, the method comprising:
   a. introducing the solid or semi-solid substance into a pool of the at least one solvent in the tank, wherein the at least one solvent is capable of dissolving the compound;
   b. conveying the solid or semi-solid substance downward along the inclined first upper surface through the pool of the at least one solvent in the tank;
   c. conveying the solid or semi-solid substance upward along the second inclined first lower surface through the pool of the at least one solvent in the tank;
   d. repeating steps (b) and (c) for the second conveying assembly; and
   e. conveying the solid or semi-solid substance upward along the inclined screen section of the exit conveyor to separate the at least one solvent from the solid or semi-solid substance,
   wherein the solid or semi-solid substance introduced into the pool of at least one solvent comprises plant matter and the compound comprises rubber.

8. The method of claim 7, wherein the solid or semi-solid substance introduced into the pool is guayule biomass and the substance conveyed upward along the inclined screen section of the exit conveyor is guayule biomass.

9. The extractor of claim 1, wherein the exit conveyor has a length that is approximately 175% to approximately 200% the length of the inclined first conveyor.

10. The extractor of claim 1, wherein the solvent inlet is configured to spray solvent onto the inclined screen section of the exit conveyor.

11. The extractor of claim 1, wherein the inclined screen section of the exit conveyor comprises 40% to 55% of the length of the exit conveyor.

12. The extractor of claim 2, wherein the inclined screen section of the exit conveyor comprises 40% to 55% of the length of the exit conveyor.

13. The extractor of claim 1, further comprising a separator in fluid communication with the solvent outlet, the separator configured to separate small particles of solid or semi-solid substance from solvent as it exits the solvent outlet.

14. The extractor of claim 1, wherein the substance outlet includes a run-down screen configured to receive solvent and solid or semi-solid substance from the exit conveyor and allow at least a portion of the solvent to drain from the solid or semi-solid substance while on the screen; wherein the run-down screen has no moving parts and allows for removal of the solid or semi-solid substance from the run-down screen by gravity.

15. The extractor of claim 1, wherein the inclined first conveyor and the exit conveyor each include paddles configured to assist in moving the solid or semi-solid substance along the upper and lower surfaces associated with each respective conveyor.

16. The extractor of claim 1, further comprising at least one additional solvent inlet, solvent outlet, substance inlet, or substance outlet.

17. The extractor of claim 1, wherein the extractor comprises additional conveying assemblies positioned between the inclined first conveyor and the exit conveyor which additional conveying assemblies are configured for moving the solid or semi-solid substance through the pool of at least one solvent in the tank such that the extractor has a total of four of the additional conveying assemblies arranged in series, each additional conveying assembly including an inclined conveyor with an inclined upper surface and an inclined lower surface.

18. A method of separating a compound from a solid or semi-solid substance using at least one solvent in the tank of the extractor of claim 1, the method comprising:
  a. introducing the solid or semi-solid substance into a pool of the at least one solvent in the tank, wherein the at least one solvent is capable of dissolving the compound;
  b. conveying the solid or semi-solid substance downward along the inclined first upper surface of the inclined first conveyor through the pool of the at least one solvent in the tank;
  c. conveying the solid or semi-solid substance upward along the inclined first lower surface through the pool of the at least one solvent in the tank; and
  d. conveying the solid or semi-solid substance upward along the inclined screen section of the exit conveyor to allow for separation of solvent from the solid or semi-solid substance, wherein the solid or semi-solid substance introduced into the pool of the at least one solvent in the tank comprises plant matter and the compound comprises rubber.

19. The method of claim 18, further comprising at least one of the following:
  a. introducing the at least one solvent into the tank by spraying solvent over the inclined screen section of the exit conveyor;
  b. keeping the solid or semi-solid substance substantially constantly immersed in the pool of the at least one solvent after introducing the solid or semi-solid substance into the pool of the at least one solvent and before conveying the solid or semi-solid substance upward along the inclined screen section of the exit conveyor; or
  c. flowing the at least one solvent in a direction from the exit conveyor to the inclined first conveyor.

20. The method of claim 18, wherein the solid or semi-solid substance introduced into the pool of the at least one solvent is guayule biomass and the substance conveyed upward along the inclined screen section of the exit conveyor is guayule biomass.

* * * * *

UNITED STATES PATENT AND TRADEMARK OFFICE
CERTIFICATE OF CORRECTION

| | | |
|---|---|---|
| PATENT NO. | : 10,843,103 B2 | Page 1 of 1 |
| APPLICATION NO. | : 16/371765 | |
| DATED | : November 24, 2020 | |
| INVENTOR(S) | : White et al. | |

It is certified that error appears in the above-identified patent and that said Letters Patent is hereby corrected as shown below:

In the Claims

In Column 14, Line 39, Claim 7, delete "second".

Signed and Sealed this
Seventh Day of November, 2023

*Katherine Kelly Vidal*

Katherine Kelly Vidal
*Director of the United States Patent and Trademark Office*